United States Patent [19]

Ahlstone

[11] 4,272,109

[45] Jun. 9, 1981

[54] RING GASKET RETAINER FOR FLANGED CONNECTORS

[75] Inventor: Arthur G. Ahlstone, Ventura, Calif.

[73] Assignee: Vetco, Inc., Ventura, Calif.

[21] Appl. No.: 43,335

[22] Filed: May 29, 1979

Related U.S. Application Data

[63] Continuation of Ser. No. 804,726, Jun. 8, 1977, abandoned.

[51] Int. Cl.$^3$ .............................................. F16L 17/06
[52] U.S. Cl. .................................. 285/336; 277/180; 277/189; 285/363; 285/379
[58] Field of Search ........................ 285/18, 23, 25, 27, 285/336, 334.2, 379, 380, DIG. 18, 363; 277/9.5, 10, 11, 171, 180, 167.5, 189

[56] References Cited

U.S. PATENT DOCUMENTS

| | | | |
|---|---|---|---|
| 923,112 | 5/1909 | Brodie | 285/379 |
| 2,291,709 | 8/1942 | Goetze | 285/336 |
| 2,753,197 | 7/1956 | Loeffler | 285/336 |
| 2,863,679 | 12/1958 | Dunbar | 285/336 |
| 3,367,682 | 2/1968 | Meriano | 277/167.5 X |
| 3,387,867 | 6/1968 | Rogers | 285/336 |
| 3,492,027 | 1/1970 | Herring | 285/18 |
| 3,521,892 | 7/1970 | Sheesley et al. | 285/336 X |
| 3,628,812 | 12/1971 | Larralde | 285/334.2 X |
| 3,661,408 | 5/1972 | Gibbons | 285/18 |
| 3,857,572 | 12/1974 | Taylor | 277/9.5 |

FOREIGN PATENT DOCUMENTS 4635801 2/1968 Japan ........................ 277/167.5

*Primary Examiner*—Dave W. Arola
*Attorney, Agent, or Firm*—Subkow and Kriegel

[57] ABSTRACT

A ring gasket is retained in position on a pipe connector flange with the ring gasket properly positioned for sealing engagement and loading between opposed circular grooves in the flange and a mating flange or member. The ring gasket is supported, in some forms, at its outer periphery by a member connected to one of the connector parts between opposed abutting surfaces of the connector parts when they are connected. The ring gasket is increased in size, from a standard, to compensate for the standoff, so that the ring gasket is properly loaded. The support for the ring gasket, in another form, includes a direct connection between the ring gasket and the flange or support means, and in other forms, the ring gasket is supported at its inner periphery, and can not affect abutment between the flanges. The ring gasket has peripheral, oppositely tapered sealing surfaces loaded into sealing engagement with opposing companion surfaces forming the grooves in the flanges upon making up of the connection. The connection between the retaining means and the ring gasket permits such axial movement of the ring gasket as is necessary to enable loading thereof.

19 Claims, 9 Drawing Figures

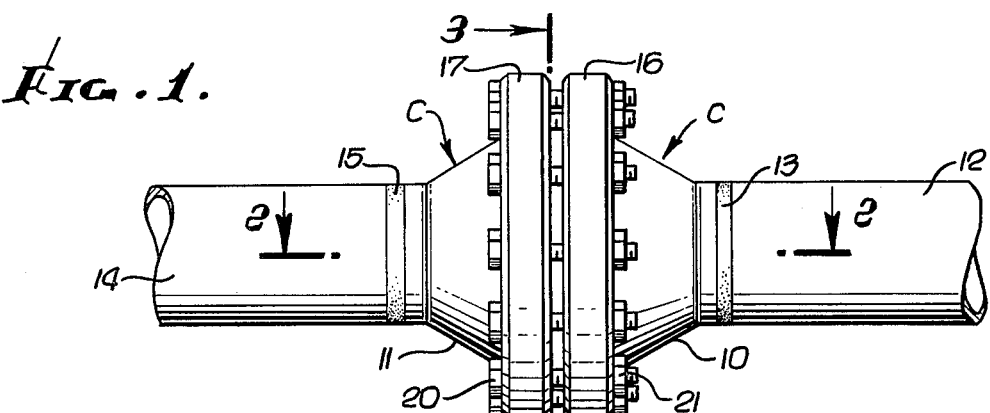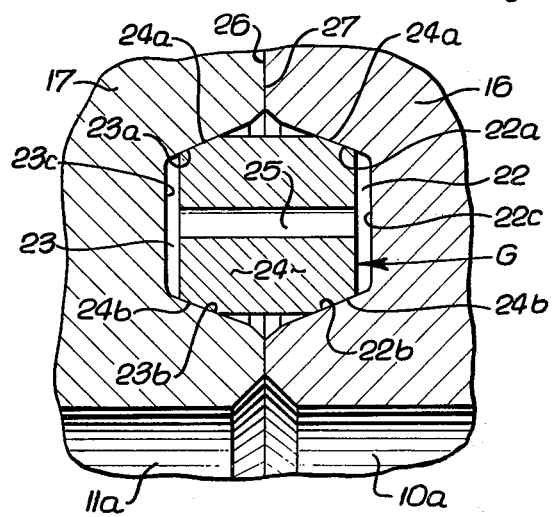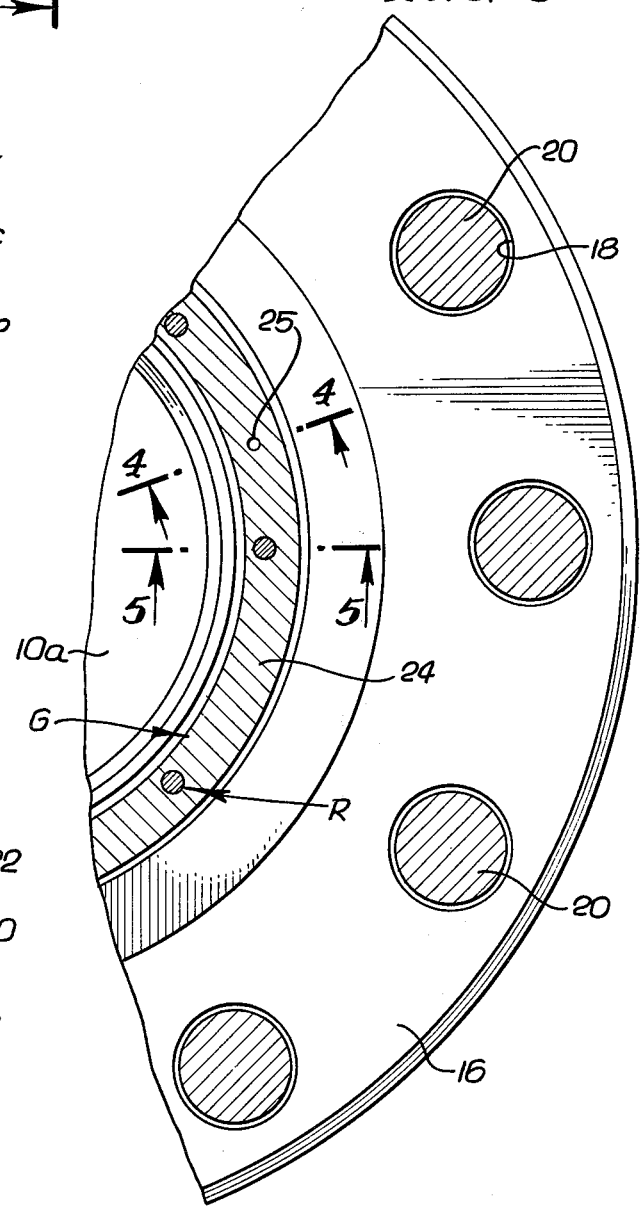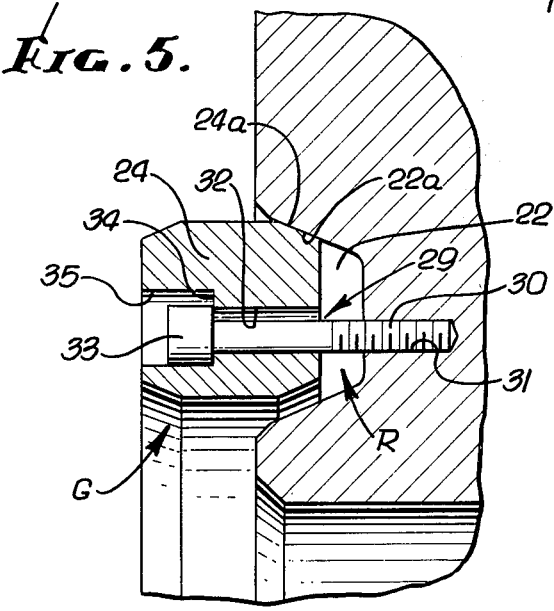

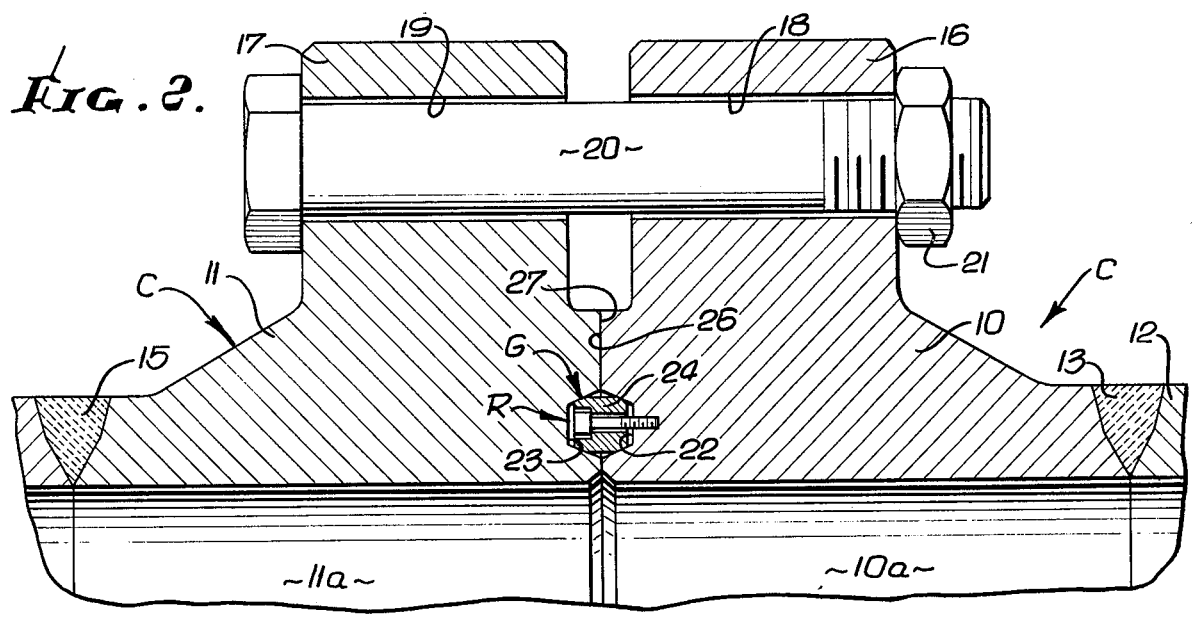
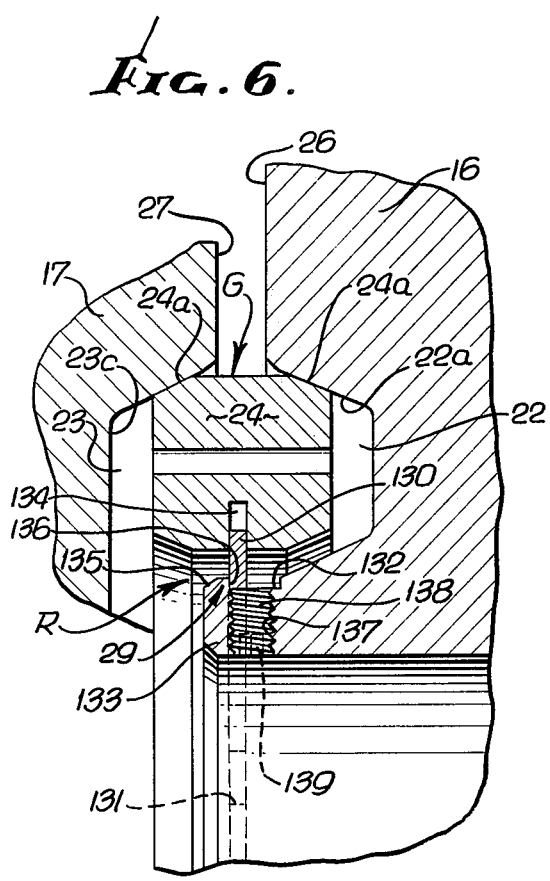
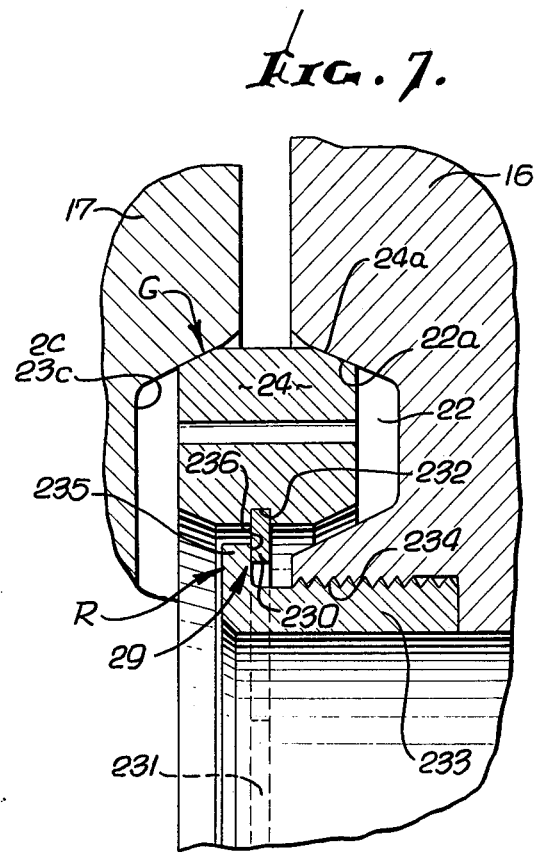

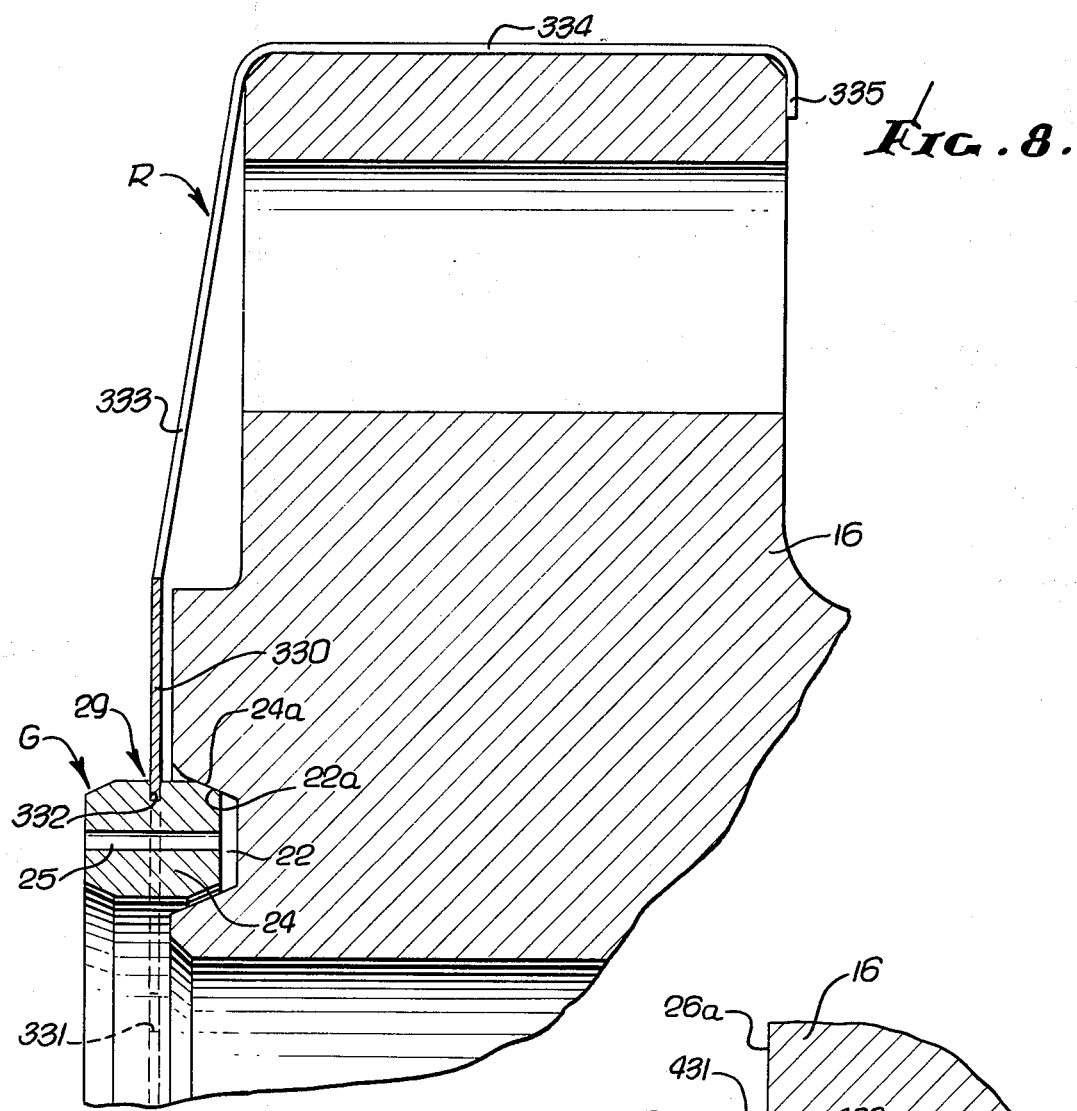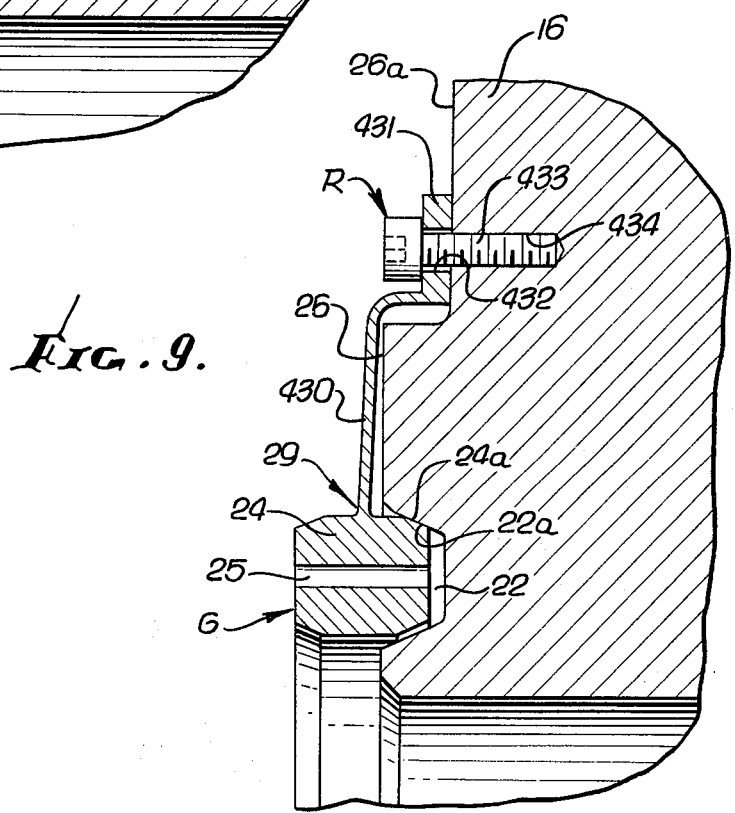

RING GASKET RETAINER FOR FLANGED CONNECTORS

The application is a continuation of my pending application, Ser. No. 804,726, filed June 8, 1977, now abandoned.

BACKGROUND OF THE INVENTION

Flanged pipe connections for pipe lines, well heads and the like commonly involve the interconnection of opposed flanges or a flange and another member to engage and load a soft iron ring gasket in opposing circular grooves in the confronting flange or member surfaces. Such connectors are, for example, the subject of specifications of the American Petroleum Institute (API) and have become standardized.

When such connections are being made up with the flanges or members disposed horizontally or nearly horizontally, initial manual positioning or locating of the ring gasket in an upwardly opening circular groove is a relatively simple matter. The bringing or stabbing together of the connector parts may also be relatively simple. In the case of connections being made under stable conditions, on land, if the ring gasket tends to shift laterally, it is also a simple matter to manually hold the ring gasket in place as the connector parts are moved together, although there is danger of hand or finger injury.

Such connections, however, are also being widely used in unstable or difficult environments, for example, for underwater pipe lines and connectors where divers are employed to make up the connectors, and the manual holding of the ring gasket in position is very difficult and tricky, particularly if the diver or divers are required to manually push or pull on the connector parts to bring them into position for connection. The problems are accentuated where the connector is being made up in a horizontal or other non-vertical pipe line or connector.

As disclosed in my companion application for patent, Ser. No. 804,625, filed June 8, 1977, means are provided for initially positioning and locating a ring gasket with respect to the circular groove in one flange connector part, so that the ring gasket is properly positioned for sealing engagement in both of the opposed circular grooves of the companion connector parts when the connector is made up.

More particularly, means are provided for supporting the ring gasket on or adjacent to one of the connector parts, so that the ring gasket remains in proper position for engagement in the grooves of the connector parts, without regard for the angle at which the connector parts may be disposed during makeup. Accordingly, in the case of an underwater connection made up by a diver or divers, the difficult task of manually positioning the ring gasket between the flanges and the hazard to the hands are avoided. The invention renders more safe the making up of such connections even under more stable or surface conditions, and even when the connector parts are on vertical axes, the locating of the ring gasket for proper engagement between the connector parts is assured.

The offshore oil and gas industry has standardized on the use of ring gaskets of the type designated "RX" or "BX" by the API. Reference is made to the "API SPECIFICATION FOR WELL-HEAD EQUIPMENT", API Spec. 6A, Tenth Edition, March, 1974, American Petroleum Institute, Division of Production, Dallas, Texas, pages 33 and 34, for examples of such ring gaskets and companion grooves in flange connections. The present invention is particularly directed towards supporting and positioning such ring gaskets of the "BX" type, but is also applicable to the type "R" ring gaskets, see the API specification, page 32, for examples.

Connectors using "BX" type ring gaskets are normally used in connectors which are made up with the opposing, groove containing surfaces in abutting engagement, and the ring gasket may be deformed into engagement with both side walls of one or both of the grooves.

Broadly speaking, the invention relates to supporting and positioning the ring gasket for engagement in the grooves of the connector or flange parts. Specifically, the invention relates to supporting and positioning the ring gasket of the above-identified "BX" type for engagement in the grooves of the connector or flange part by means permitting movement of the connector parts together, so that the ring gasket is properly loaded between opposing inclined groove surfaces in the respective connector parts. In the forms of the invention herein disclosed, in a specific sense, the support means is connected to or supportable adjacent to one connector part or an abutment flange portion and has means holding the ring gasket in position in the groove of that part in contact with the outer marginal sealing wall of the groove, so that when the companion connector part is assembled against the gasket ring, the ring will engage and be loaded between the walls of the opposed grooves, to an extent determined by the movement of the connector parts together. Such movement in typical API flange connectors using "BX" ring gaskets is limited by engagement of confronting radial portions of the flanges. Certain forms of the present invention provide a ring gasket support which is located between such confronting flanges surfaces, and in such forms, the axial dimension of the ring gasket is increased an equal distance from the ring gasket support.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings:

FIG. 1 is a side elevation showing a pipe connector incorporating the ring gasket retainer for flanged connectors embodying the invention;

FIG. 2 is an enlarged fragmentary longitudinal section taken on the line 2—2 of FIG. 1;

FIG. 3 is an enlarged fragmentary transverse section taken on the line 3—3 of FIG. 1;

FIG. 4 is a further enlarged fragmentary detailed view in radial section taken on the line 4—4 of FIG. 3;

FIG. 5 is an enlarged fragmentary radial section as taken on the line 5—5 of FIG. 3, illustrating one form of ring gasket retainer, before make up of the connection;

FIG. 6 is a fragmentary radial section generally corresponding to FIG. 5 but showing another form of ring gasket retainer;

FIG. 7 is another fragmentary radial section showing a further form of ring gasket retainer;

FIG. 8 is another fragmentary radial section showing a further form of ring gasket retainer; and FIG. 9 is another fragmentary radial section showing a further form of ring gasket retainer.

As seen in the drawings, a pair of mating connector parts, in the form of flanged connectors C, have tubular housings 10 and 11. One length of pipe 12 is secured to the connector housing 10 by a circumferentially continuous weld 13 and another length of pipe 14 is secured to the other connector housing 11 by a circumferentially continuous weld 15. Each connector housing 10 and 11 has a radially outwardly projecting, circumferentially continuous connector flange designated 16 and 17, respectively. The flange 16 has a suitable number of circumferentially spaced bolt holes 18 and the flange 17 has a corresponding plurality of bolt holes 19, adapted to be aligned when the flange connector is being made up, for the reception of bolts 20, and retaining nuts 21 are adapted to be tightened down on the bolts to load the flanges 16 and 17 together, with a ring gasket G axially preloaded in opposing annular grooves 22 and 23 in the respective connector parts 10 and 11, so that the ring gasket will prevent leakage between the flanges 16 and 17. Such connectors of the flanged type, employing soft iron ring gaskets G, are generally the subject of the above-identified API specification for well head equipment.

Typically when such connectors are being made up and the angle of the pipe is such that the ring gasket does not tend to seat in one of the opposing grooves to be held by gravity in a proper position for engagement between the flanges, the gasket must be manually held in position. Even in the case of fairly large pipe connectors, the holding of the ring gasket in initial position can be hazardous and very difficult, particularly in the case of underwater connections which are being made by divers who are wearing diving gear and gloves which make such manual activities very difficult.

The present invention provides retaining means R for initially supporting the ring gasket G and holding the same in a proper position with respect to one of the grooves in one of the connector parts, while the other connector part is being moved into place and the bolt holes 18 and 19 aligned for reception of the bolts 20 and the application thereto of the nuts 21.

The retaining means are, as herein illustrated in a specific sense, do not limit or interfere with the loading of the connector flanges towards one another to establish a predetermined spaced relation between the opposing walls of the opposing grooves 22 and 23, for the proper seating, loading and sealing effect of the ring gasket G.

As seen in FIG. 4, the ring gasket G is in preloaded and sealing relation to the opposing flanges 16 and 17 in the opposing respective grooves 22 and 23. The groove 22 is formed in the flange or member 16 by an outer, inclined circumferentially continuous seating wall 22a, and an opposing inner, circumferentially continuous, inclined seating wall 22b diverging from a base or bottom wall 22c. Correspondingly, the groove 23 in the flange 17 is formed by an outer, inclined, circumferentially continuous seating wall 23a and an opposing inclined, circumferentially continuous, inner seating wall 23b diverging from a base wall 23c. The ring gasket G has a central ring body 24, at each end of which is an outer beveled or tapered wall 24a, adapted to seat against the opposing inclined walls 22a and 23a of the respective flanges, and an inner beveled or tapered wall 24b, adapted to seat against the opposing inclined walls 22b and 23b of the respective flanges, when the connector parts are brought together by the bolts 20 and nuts 21. Engagement of the confronting beveled flange walls 22a and 23a and 22b and 23b with the gasket ring walls 24a and 24 establishes an axial and circumferential loading between these sealing flange and gasket ring walls. Movement of the flanges 16 and 17 towards one another is limited by engagement of the opposed radial flange surfaces 26 and 27.

When the connector is made up and the ring gasket G is in proper position, as just described above, it will be observed that the pressure of fluid within the fluid passages 10a and 11a of the connector may pass between the ring gasket and one of the walls 22b or 23b of the flanges to find access to the space between the end surfaces 24c of the ring gasket and the base 22c or 23c of one of the grooves, but will be equalized across the ends of the ring gasket by access to the base of the other groove, through an equalizing port or ports 25, which extend longitudinally through the ring gasket body 24 at a suitable number of circumferentially spaced locations. Such ports 25 are required in API ring gaskets of the "BX" type, but not in some others.

Referring more particularly to FIG. 5, the ring gasket retaining means R are adapted to initially support the ring gasket body 24, with one tapered end thereof disposed within the groove 22, and with the other tapered end of the body 24 disposed for engagement within the companion flange groove 23 when the connector is assembled.

In general, the retaining means R includes means 29 for connecting the ring gasket body 24 to the connector flange 16 with the beveled gasket surface 24a in or nearly in engagement with the opposed beveled wall 22a of the flange 16 forming the outer peripheral wall of the groove 22. In the form of FIG. 5, the connecting means 29 comprises a suitable plurality of screw fasteners 30 threaded into threaded bores 31 spaced about the flange 16 and extending longitudinally from the bottom of the groove 22. The fasteners 30 extend through circumferentially spaced openings 32 in the ring gasket body, and the screw heads 33 seat at the base 34 of a counter bore 35 in the ring gasket body. The screw receiving bore 32 and counter bore 35 are enlarged radially or are of sufficiently larger diameter than the stem of the screw 30 and the head 33 thereof to enable the gasket body to shift axially relative to the fasteners and to be radially loaded inwardly to the loaded and sealing condition of FIG. 4. Such a structure enables the utilization of a standard type "BX" ring gasket, without modifying any of its dimensions or proportions.

Referring to FIG. 6, the retaining means R is also constructed in such a manner that the ring gasket G is supported with its outer peripheral beveled surface 24a in or almost in engagement with the outer peripheral beveled wall 22a of the flange 16 forming the groove 22, so that when the flanges 16 and 17 are interconnected with their opposing radial faces 26 and 27 loaded into engagement, the ring gasket G will be loaded and sealingly engaged with the opposing flanges as shown in FIG. 4. In this form, the connecting means 29 which support the ring gasket on the flange 16 comprises a resilient split ring 130, radially split as at 131, and engaged at its inner periphery within a circumferentially extended outwardly opening groove formed in an annular axial extension 133 of the body of the flange 16, and, at its outer periphery, the ring 130 is disposed in an internal circumferentially continuous groove 134 formed in the ring gasket body 24 and of such radial depth as to allow expansion of the split ring during assembly of the ring gasket body and split ring 130 on the flange extension 133 as well as to allow radial inward deformation of the ring gasket body as the connector parts are loaded together. To assemble the ring gasket and the resiliently contractible split ring 130 on the flange extension 133 the ring gasket is forced axially into the groove 22 over the flange extension 133, which has an external beveled surface 135 for assisting in expanding the split ring to enable its passage over the outside diameter of the flange extension 133, until it is enabled to contract into the groove 132. The inwardly facing shoulder 136 forming the groove 132 prevents removal of the ring gasket from the groove 22 until the split retainer ring 130 is expanded outwardly. When the opposing flange 17 is bolted against the flange 16 the freedom of motion of the split ring 130 in the axially extended groove 132 of the flange extension 133 and in the internal groove 134 in the ring gasket body enables the ring gasket to be axially loaded and circumferentially deformed into the sealing condition of FIG. 4. For enabling removal of the ring gasket, the flange extension 133 is provided with a suitable plurality of circumferentially spaced radial bores 137 adapted to receive threaded screws 138 formed at 139 to receive a tool, whereby the screws can be threaded and force the split ring 132 to be expanded circumferentially outwardly to the extent necessary to allow it to be backed off of the flange extension 133.

It will be understood that in this type of connection, the companion flange 17 must be provided with adequate clearance to accomodate the axial extension 133 of the flange section 16, so that the connector can be loaded between its radial faces 26 and 27. Accordingly, the connector flange 17 in FIG. 6 will be seen to have the radial surface 23c which forms the face of the ring gasket receiving groove 23 extending inwardly to the bore of the connector flange. In other words, in this form the inner wall 23b of the gasket receiving groove 23 is eliminated to provide clearance space for the extension 133 of the connector flange 16.

Referring to FIG. 7, another form of retaining means R for the ring gasket G is illustrated, wherein the ring gasket body 24 is initially held with its outer beveled surface 24a in or approximately in contact with the outer beveled wall 22a forming the groove 22 in the connector flange 16. Here again, the flange 16 is modified slightly to support the ring gasket G at its inner periphery by the connecting means 29, and the companion flange 17 is again constructed like that of FIG. 6, so that the radial surface 23c forming the bottom of the gasket receiving groove 23 extends radially inward to the bore of the flange 17. In this form the body 24 of the ring gasket G has a radially inwardly projecting peripheral flange 230. In the specific form shown, the flange 230 is provided by installing a split ring, radially split at 231 in a groove 232 which extends circumferentially about the inner periphery of the ring gasket body 24. However, if desired, the flange 230 could be integral with the ring gasket body. In either case the flange 16 is modified by the provision of an externally threaded sleeve 233 threadedly engaged within an internal bore 234 in the body of the flange 16 and having an outwardly projecting end flange 235 providing a shoulder 236 confronting the flange 230 on the ring gasket body to retain the ring gasket in place with the ring gasket body disposed for operative sealing engagement between the opposed flanges 16 and 17 when the connector is made up.

In FIGS. 8 and 9 retainer means R for the ring gasket G are shown, wherein the connecting means 29 is attached to or formed on the ring gasket body in such a manner that a portion of the connecting means 29 is disposed between the confronting flange faces, when the connector is made up, and limits movement of the flanges towards one another. Accordingly, the ring gasket body is correspondingly modified by increasing the axial length thereof an amount equaling the amount of standoff between the flanges caused by the connecting means 29, so that the confronting flange and ring gasket faces will nevertheless be properly loaded together, as seen in FIG. 4 when the connection is made up.

Referring first to FIG. 8, the retaining means R for supporting the ring gasket G with its inner beveled face and the inner beveled face of the flange in or nearly in engagement comprises a web 330 extending circumferentially about the ring gasket body and projecting radially outwardly for engagement between the confronting flange surfaces when the connector is made up. In the specific form illustrated, the web 330 is radially split at 331 for installation in a circumferentially extended outer peripheral groove 332 in the ring gasket body 24. However, it will be understood that the web 330 may be formed integral with the ring gasket body. Projecting outwardly from the web 330 at a suitable number of circumferentially spaced locations are tabs 333 which extend outwardly about the outer periphery of the flange 16 and are bent to provide a portion 334 engaged with the outer periphery of the flange 16, the end extremities 335 of the tabs 333 being bent radially inward at 335 to engage the outer side wall of the flange 16 to retain the tabs and consequently the support web 330 and the ring gasket G in place, as shown in FIG. 8, so that upon the making up of the connection between the flanges 16 and 17, the ring gasket body 24 will be loaded into sealing engagement in the opposing grooves, as seen in FIG. 4.

Referring to FIG. 9, the retaining means R having the connecting means 29 for initially supporting the ring gasket G in position with its outer beveled surface 24a in or nearly in engagement with the outer beveled wall 22a forming the groove 22 of the flange 16, is of the type wherein a flange or web 430 extending about the outer periphery of the ring gasket body 24 will be engaged between the opposing radial surfaces 26 and 27 of the flanges 16 and 17, so that the axial dimension of the ring gasket body has been increased by an amount equaling the thickness of the web 430 whereby the ring gasket will be properly seated and loaded between the beveled surfaces forming the grooves in standard flange connectors. In this form, the circumferentially extended web or flange 430 is shown as being integral with the gasket ring body 24, but if desired, the structure can be assembled as in the case of the structure of FIG. 8, wherein the flange or web 430 is radially split to allow its installation about the ring gasket body. Adjacent its outer periphery, the web or flange 430 is provided with a supporting ring or circumferentially spaced ears 431 having openings 432, enabling connection of the retainer to a radially outwardly projecting wall 26a of the flange body 16, by a suitable number of circumferentially spaced fasteners 433 engaged in threaded bores 434 disposed in circumferentially spaced relation about the flange body. It will be understood that if desired, the connecting ring or ears 431 may be formed to receive large fasteners extending through certain of the circumferentially spaced bolt holes formed about the outer periphery of the connector flange 16. The fastener openings 432 in the connecting ring or ears 431 are sufficiently larger than the fasteners 433 and the web 430 may be sufficiently flexible to allow the ring gasket body 24 to shift axially and circumferentially when loaded between the flanges in grooves 22 and 23 as shown in FIG. 4.

From the foregoing it will now be apparent that the present invention provides a connector of the flange type having the opposed angular grooves for receiving a ring gasket, particularly of the "BX" type, wherein the ring gasket is initially supported and positioned for sealing engagement and loading between the opposed flanges when the connection is made up. However, the invention is not limited solely to supporting "BX" type ring gaskets, since features of the invention are applicable to supporting other types of ring gaskets by retaining means which initially hold a ring gasket in position for engagement by opposing flange or connector sealing surfaces which axially and circumferentially load the ring gasket seal.

I claim:

1. In a connector: a pair of connector bodies having a fluid passage therein when said bodies are connected together, said bodies having opposed radial surfaces with circumferentially continuous grooves circumscribing said passage and each groove being defined by opposed side walls diverging from the bottom of the groove, a metal gasket ring in said grooves in sealingly and radially inwardly loaded engagement with said opposed side walls of the respective grooves, retainer means carried by one of said bodies, means shiftable relative to said gasket ring and said one of said bodies for connecting said retainer means to said gasket ring and initially holding said gasket ring in position with respect to the groove in one of said bodies to be clamped between said bodies with said side walls loaded axially and circumferentially against said gasket ring, and means clamping said bodies together, said means connecting said retainer means to said gasket ring being flexible and capable of flexing with respect to said gasket ring and said one of said bodies for enabling movement of said gasket ring during loading thereof.

2. In a connector as defined in claim 1; said means connecting said retainer means to said gasket ring including a shiftable connection.

3. In a connector as defined in claim 1; said means connecting said retainer means to said gasket ring being a flexible metal web between said retainer means and said gasket ring enabling said web to flex with respect to said gasket ring.

4. In a connector as defined in claim 1; said means connecting said retainer means to said gasket ring being a flexible metal web between said retainer means and said gasket ring, said web being clamped between said radial surfaces.

5. In a connector: a pair of connector bodies having a fluid passage therein when said bodies are connected together, said bodies having opposed radial surfaces with circumferentially continuous grooves circumscribing said fluid passage and each groove being defined by side walls diverging from the bottom of the groove, a metal gasket ring in said grooves in sealing and radially inwardly loaded engagement with said opposite side walls of the respective grooves, retainer means carried by one of said bodies, means connecting said retainer means to said gasket ring and initially holding said gasket ring in position with respect to the groove in one of said bodies to be clamped between said bodies with said side walls loaded axially and circumferentially against said gasket ring, and means clamping said bodies together, said means connecting said retainer means to said gasket ring enabling movement of said gasket ring during loading thereof, said radial surfaces limiting loading of said gasket ring; said means connecting said retainer means to said gasket ring being a metal web between said retainer means and said gasket ring and integral therewith.

6. In a connector: a pair of connector bodies having a fluid passage therein when said bodies are connected together, said bodies having opposed radial surfaces with circumferentially continuous grooves circumscribing said fluid passage and defined by side walls projecting outwardly at an angle from the bottom of the groove, a metal gasket ring in said grooves in sealing and radially inwardly loaded engagement with at least a pair of opposite outer side walls of the respective grooves, retainer means, means connecting said retainer means to said gasket ring and initially holding said gasket ring in position with respect to the groove in one of said bodies to be clamped between said bodies with at least said outer side walls loaded axially and circumferentially against said gasket ring, and means clamping the radial surfaces of said bodies together, said means connecting said retainer means to said gasket ring enabling movement of said gasket ring during loading thereof, said means connecting said retainer means to said gasket ring including an internal flange on said gasket ring, said retainer means providing a shoulder on said one of said bodies engaged with said internal flange.

7. In a connector: a pair of connector bodies having a fluid passage therein when said bodies are connected together, said bodies having opposed radial surfaces with circumferentially continuous grooves circumscribing said fluid passage and defined by side walls projecting outwardly at an angle from the bottom of the groove, a metal gasket ring in said grooves in sealing and radially inwardly loaded engagement with at least a pair of opposite outer side walls of the respective grooves, retainer means, means connecting said retainer means to said gasket ring and initially holding said gasket ring in position with respect to the groove in one of said bodies to be clamped between said bodies with at least said outer side walls loaded axially and circumferentially against said gasket ring, and means clamping said bodies together, said means connecting said retainer means to said gasket ring enabling movement of said gasket ring during loading thereof, said clamping means clamping said radial surfaces together, said means connecting said retainer means to said gasket ring including a stop ring on the inner periphery of said gasket ring, and said retainer means including means on said one of said bodies forming a groove receiving said stop ring and a shoulder engageable with said stop ring for initially positioning said gasket ring with respect to said outer side wall of said one of said bodies.

8. In a connector as defined in claim 7; said gasket ring having an inner peripheral groove receiving said stop ring, said stop ring being split and resilient, said peripheral groove being of a depth sufficient to enable expansion of said stop ring into said peripheral groove.

9. In a connector as defined in claim 7; said gasket ring having an inner peripheral groove receiving said stop ring, said stop ring being split and resilient, said peripheral groove being of a depth sufficient to enable expansion of said stop ring into said peripheral groove, and including means for expanding said stop ring into said peripheral groove to allow separation of said ring gasket from said one of said bodies.

10. In a connector as defined in claim 7; said means forming a groove and a shoulder being a sleeve threadedly connected to said one of said bodies and having said shoulder thereon.

11. In a connector: a pair of connector bodies having a fluid passage therein when said bodies are connected together, said bodies having opposed radial surfaces with circumferentially continuous grooves circumscribing said fluid passage and defined by said walls projecting outwardly at an angle from the bottom of the groove, a metal gasket ring in said grooves in sealing and radially inwardly loaded engagement with at least a pair of opposite outer side walls of the respective grooves, retainer means, means connecting said retainer means to said gasket ring and initially holding said gasket ring in position with respect to the groove in one of said bodies to be clamped between said bodies with at least said outer side walls loaded axially and circumferentially against said gasket ring, and means clamping said bodies together, said means connecting said retainer means to said gasket ring enabling movement of said gasket ring during loading thereof, said clamping means clamping said radial surfaces together, said means connecting said retainer means to said gasket ring including an internal flange on said gasket ring, said retainer means being a sleeve threaded in said one of said bodies and having a shoulder engageable with said internal flange to initially position said gasket ring.

12. In a connector: a pair of connector bodies having a fluid passage therein when said bodies are connected together, said bodies having opposed radial surfaces with circumferentially continuous grooves circumscribing said fluid passage and defined by side walls projecting outwardly at an angle form the bottom of the groove, a metal gasket ring in said grooves in sealing and radially inwardly loaded engagement with at least a pair of opposite outer side walls of the respective grooves, retainer means, means connecting said retainer means to said gasket ring and initially holding said gasket ring in position with respect to the groove in one of said bodies to be clamped between said bodies with at least said outer side walls loaded axially and circumferentially against said gasket ring, and means clamping said bodies together, said means connecting said retainer means to said gasket ring enabling movement of said gasket ring during loading thereof, said retainer means comprising fastener means connected to said one of said bodies in circumferentially spaced relation, said means connecting said retainer means to said gasket ring providing a loose connection with said fasteners enabling said movement of said gasket ring, said gasket ring having holes extending axially therethrough and counterbores aligned with said holes, said fasteners loosely extending through said holes and having heads loosely disposed in said counterbores.

13. In a connector; a pair of connector bodies having a fluid passage therein when said bodies are connected together, said bodies having opposed radial surfaces with circumferentially continuous grooves circumscribing said fluid passage and defined by side walls projecting outwardly at an angle from the bottom of the groove, a metal gasket ring in said grooves in sealing and radially inwardly loaded engagement with at least a pair of opposite outer side walls of the respective grooves, retainer means, means connecting said retainer means to said gasket ring and initially holding said gasket ring in position with respect to the groove in one of said bodies to be clamped between said bodies with at least said outer side walls loaded axially and circumferentially against said gasket ring, and means clamping said bodies together, said means connecting said retainer means to said gasket ring enabling movement of said gasket ring during loading thereof, said means connecting said retainer means to said gasket ring comprising an annular web secured to said gasket ring and projecting outwardly of said gasket ring, said clamping means clamping said web between said radial surfaces of said bodies, said web having means at its outer periphery spaced outwardly of said radial surfaces, said retainer means including fasteners secured to said one of said bodies and securing said web retainer means to said one of said bodies.

14. In a connector: a pair of connector bodies having a fluid passage therein when said bodies are connected together, said bodies having opposed radial surfaces with circumferentially continuous grooves circumscribing said fluid passage and defined by side walls projecting outwardly at an angle from the bottom of the groove, a metal gasket ring in said grooves in sealing and radially inwardly loaded engagement with at least a pair of opposite outer side walls of the respective grooves, retainer means, means connecting said retainer means to said gasket ring and initially holding said gasket ring in position with respect to the groove in one of said bodies to be clamped between said bodies with at least said outer side walls loaded axially and circumferentially against said gasket ring, and means clamping said bodies together, said means connecting said retainer means to said gasket ring enabling movement of said gasket ring during loading thereof, said means connecting said retaining means to said gasket ring comprising a web disposed about said gasket ring and clamped between said radial surfaces by said clamping means, and said retaining means including means connected to said web spaced outwardly of said radial surfaces and connected with said one of said bodies.

15. In a connector as defined in claim 14; said means connected to said web being tabs spaced circumferentially of said web and having means connected to said one of said bodies.

16. In a connector as defined in claim 14; said means connected to said web being tabs spaced circumferentially of said web, said tabs having portions bent over the outer edge of said one of said bodies and end portions bent inwardly around the outer edge of said body.

17. In a connector as defined in claim 14; said means connected to said web being fasteners engaged in said one of said bodies and means on said web engaged by said fasteners.

18. In a connector as defined in claim 14; said gasket ring having an outer peripheral groove, said web being radially split and installed in said peripheral groove.

19. In a connector as defined in claim 1; said retainer means being connected to said one of said bodies.

* * * * *